J. BEISWANGER.

BAKING DISH.

APPLICATION FILED JUNE 12, 1918.

Reissued Dec. 10, 1918. 14,558.

Inventor,
John Beiswanger
by
Edwin L. Sammels
Attorney

THE NORRIS PETERS CO., PHOTO-LITHO., WASHINGTON, D. C.

UNITED STATES PATENT OFFICE.

JOHN BEISWANGER, OF STEUBENVILLE, OHIO, ASSIGNOR TO GILL BROTHERS COMPANY, OF STEUBENVILLE, OHIO, A CORPORATION OF WEST VIRGINIA.

DESIGN FOR A BAKING-DISH.

14,558. Specification for Reissued Design. Reissued Dec. 10, 1918.

Original No. 52,016, dated May 7, 1918, Serial No. 169,591, filed May 18, 1917, for 14 years. Application for reissue filed June 12, 1918. Serial No. 239,640½. Term of patent 14 years.

*To all whom it may concern:*

Be it known that I, JOHN BEISWANGER, a citizen of the United States of America, and resident of Steubenville, county of Jefferson, State of Ohio, have invented a certain new, original, and ornamental Design for a Baking-Dish, of which the following is a specification.

In the accompanying drawing I have illustrated a baking-dish constructed in accordance with my invention.

Figure 1:
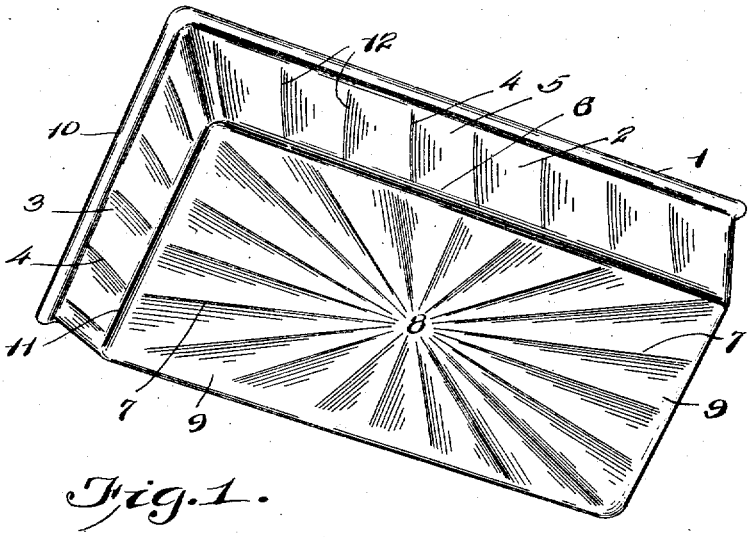
Figure 1 is a perspective showing the dish in upright position.
Figure 2:
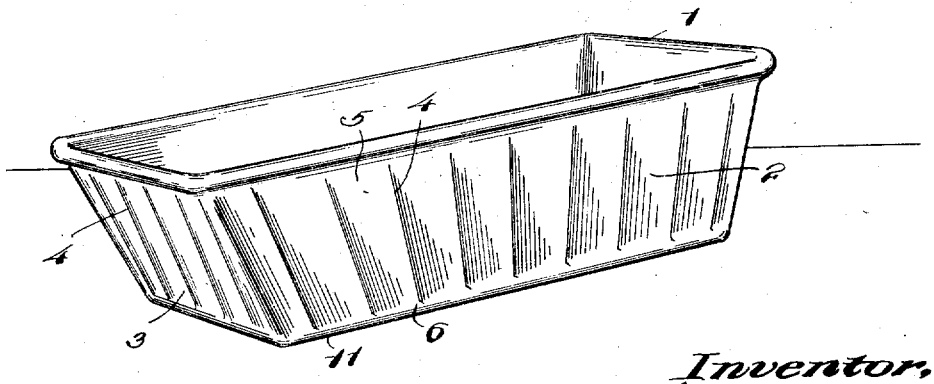
Fig. 2 is a perspective looking at the bottom from below and a little to one side.

The device consists of a transparent glass baking-dish 1 ornamented as to the lateral walls 2 and the end walls 3 by upright Doric flutes 4 tapering away at their upper ends and disappearing in a flat surface 5 and at their lower ends in flat surface 6, and ornamented on the bottom by radiating Doric flutes 7 tapering to substantially flat surfaces 8 near the center and 9 at the edges of the bottom. The top edges 10 and the juncture of the bottom with the upright walls 2, 3 are formed in smooth curves or curved surfaces 11 joining the flat surfaces 5, 6 and 9. This gives an ornamented surface which is pleasing to the eye and at the same time presents no crevices or edges in the entire dish with the exception of the peaks 12 of the flutes.

Having thus described and illustrated my invention, I claim:

The ornamental design for a baking dish substantially as shown and described.

Signed by me at Steubenville, county of Jefferson, State of Ohio, this 16th day of May, 1917.

JOHN BEISWANGER.

Witnesses:
S. F. BERRY,
M. B. WEBNER.

Copies of this patent may be obtained for five cents each, by addressing the "Commissioner of Patents, Washington, D. C."